(12) United States Patent
Hoult et al.

(10) Patent No.: US 7,560,697 B2
(45) Date of Patent: Jul. 14, 2009

(54) DETECTOR ARRAY AND CROSS-TALK LINEARITY CONNECTION

(75) Inventors: Robert Alan Hoult, Bucks (GB); Andrew James Turner, Bucks (GB)

(73) Assignee: PerkinElmer Singapore Pte. Ltd., Singapore (SG)

( * ) Notice: Subject to any disclaimer, the term of this patent is extended or adjusted under 35 U.S.C. 154(b) by 301 days.

(21) Appl. No.: 11/345,128

(22) Filed: Feb. 1, 2006

(65) Prior Publication Data
US 2006/0202124 A1  Sep. 14, 2006

Related U.S. Application Data

(63) Continuation-in-part of application No. 10/856,715, filed on May 28, 2004, now Pat. No. 7,019,675, which is a continuation of application No. 10/223,537, filed on Aug. 19, 2002, now Pat. No. 6,891,489, and a continuation-in-part of application No. 09/942,131, filed on Aug. 29, 2001.

(30) Foreign Application Priority Data

Aug. 29, 2000  (EP) ................................. 00307372
Aug. 17, 2001  (EP) ................................. 01307002

(51) Int. Cl.
*G01J 5/02* (2006.01)
(52) U.S. Cl. ...................................... 250/349
(58) Field of Classification Search ................. 250/349, 250/332, 334
See application file for complete search history.

(56) References Cited

U.S. PATENT DOCUMENTS

| 3,591,714 A | * | 7/1971 | Guildford | .................... 348/164 |
| 4,540,952 A | * | 9/1985 | Williams | .................... 330/279 |
| 4,682,022 A | | 7/1987 | Hoult et al. | |
| 4,808,809 A | | 2/1989 | Hayakawa | |
| 4,870,267 A | | 9/1989 | Beeckel | |
| 4,927,269 A | | 5/1990 | Keens et al. | |
| 5,091,646 A | | 2/1992 | Taylor | |
| 5,099,505 A | | 3/1992 | Seppi et al. | |

(Continued)

FOREIGN PATENT DOCUMENTS

EP  0 380 904  2/1989

(Continued)

OTHER PUBLICATIONS

D.W. Schiering, et al., "An FTIR microscope", *American Laboratory*: 33, pp. 26-40.

*Primary Examiner*—David P Porta
*Assistant Examiner*—Kiho Kim
(74) *Attorney, Agent, or Firm*—St. Onge Steward Johnston & Reens LLC (57) ABSTRACT

An infrared imaging microscope, particularly of the type used to carry out FT-IR measurement, including a detector in the form of a relatively small detector array of individual detector elements. The outputs of the detector elements are fed in parallel to an electronic circuit for processing. The relatively small array allows the outputs to be processed without need for multiplexing thereby avoiding reduction in signal-to-noise. The detector array may substantially range from about 3 to about 100 detector elements, and is preferably in a range from about 16 to about 64 detector elements.

19 Claims, 6 Drawing Sheets

U.S. PATENT DOCUMENTS

| | | | |
|---|---|---|---|
| 5,120,953 A * | 6/1992 | Harris | 250/227.2 |
| 5,136,154 A | 8/1992 | Carangelo et al. | |
| 5,142,286 A | 8/1992 | Ribner et al. | |
| 5,262,635 A | 11/1993 | Curbelo | |
| 5,432,336 A | 7/1995 | Carangelo et al. | |
| 5,436,451 A * | 7/1995 | Silver et al. | 250/336.1 |
| 5,489,780 A | 2/1996 | Diamondis | |
| 5,512,749 A * | 4/1996 | Iddan et al. | 250/332 |
| 5,514,865 A * | 5/1996 | O'Neil | 250/208.1 |
| 5,528,368 A * | 6/1996 | Lewis et al. | 356/456 |
| 5,712,685 A | 1/1998 | Dumas | |
| 5,815,410 A | 9/1998 | Heinke et al. | |
| 5,880,470 A | 3/1999 | Umetani et al. | |
| 6,028,312 A | 2/2000 | Wadsworth et al. | |
| 6,064,066 A | 5/2000 | Beven et al. | |
| 6,080,983 A | 6/2000 | Waczynski et al. | |
| 6,163,029 A | 12/2000 | Yamada et al. | |
| 6,274,871 B1 | 8/2001 | Dukor et al. | |
| 6,281,820 B1 | 8/2001 | Fields | |
| 6,396,048 B1 | 5/2002 | Schanz et al. | |
| 6,466,145 B2 | 10/2002 | Fields | |
| 6,891,489 B2 | 5/2005 | Turner | |
| 2003/0071216 A1 | 4/2003 | Rabolt et al. | |

FOREIGN PATENT DOCUMENTS

| | | |
|---|---|---|
| EP | 0655634 A2 | 11/1994 |
| EP | 0 731 371 | 3/1995 |
| JP | 2001021417 | 1/2001 |

* cited by examiner

DETECTOR ARRAY AND CROSS-TALK LINEARITY CONNECTION

CROSS REFERENCES

This application is a continuation in part of and claims the benefit of the filing date of U.S. patent application Ser. No. 09/942,131 filed Aug. 29, 2001 which claims priority of European Patent Application No. EP 00307372.3 filed Aug. 29, 2000; and U.S. patent application Ser. No. 10/856,715 filed May 28, 2004 now U.S. Pat. No. 7,019,675, which is a continuation of application Ser. No. 10/223,537 filed Aug. 19, 2002, now U.S. Pat. No. 6,891,489 issued May 10, 2005, which claims priority of European Patent Application No. EP 01307002.4, filed Aug. 17, 2001.

FIELD OF THE INVENTION

This invention relates to the processing of signals produced from an array of photoconductive detectors in an infrared imaging microscope. The invention has particular application in the field of Fourier Transform Infrared (FT-IR) microscopy.

BACKGROUND OF THE INVENTION

FT-IR microscopes are used to analyze small samples of material. The microscope has a viewing configuration and a measurement configuration. In both configurations the microscope can be used either in a transmitting mode or a reflecting mode, depending upon the nature of the sample. Typically such a microscope is used in conjunction with an IR spectrophotometer. A microscope of this type generally includes a source of visible radiation and can receive analyzing infrared radiation from a source in the spectrophotometer. A typical microscope includes a sample stage for carrying a sample to be investigated and optical elements for guiding radiation from one or other radiation sources to the sample stage. These elements can include a plane mirror, a toroidal coupling optic and a Cassegrain mirror assembly acting as a condenser. A microscope also includes a Cassegrain mirror assembly which images the sample at a given magnification at an intermediate image plane from where the radiation is directed to an infrared detector. The microscope also includes an optical microscope which enables an image sample on the stage to be viewed optically by means of visible radiation and thereby enables areas of interest to be identified. The microscope can also include a video camera which can be used in conjunction with the optical microscope in order to create an image of the sample for display on display means of a computer which is used to control the microscope.

Modern microscopes of this type have a stage which can be moved under computer control to allow several areas of interest to be identified, their coordinates stored and data collected subsequently automatically on the basis of that stored data. Such microscopes also include a variable aperture which can be computer controlled and is located at the intermediate image plane to mask off a portion of the sample. This combined with an oversized single detector element enables the measurement of the infrared spectrum of selected areas of the sample. By stepping the stage and repeating the measurement, the system can slowly build-up a digital image of the sample pixel-by-pixel. An arrangement of this type is described in EP-A-0731371. Typically such microscopes employ a liquid nitrogen cooled, photoconductive mercury cadmium telluride (MCT) element as the infrared detector. A microscope with a single detector has relatively long measurement times and it can take of the order of 10 hours to acquire a 128×128 pixel image.

In order to reduce measurement times, microscopes have been designed which incorporate large detector arrays rather than single detector elements. One known arrangement used in an integrated array of 64×64 liquid nitrogen cooled photovoltaic MCT detectors, each having an area of 60 square microns. This array is capable of acquiring a 64×64 pixel image simultaneously rather than sequentially as in the system referred to above. With such an arrangement it is possible to reduce considerably the measurements times and, for example, a 128×128 map can e acquired in around 5 to 7 minutes. Such arrangements, however, are extremely expensive and typically cost more than 3 times that of a microscope which employs a single detector. Part of this increased cost is due to the cost of the detector itself, which is relatively expensive and another part is attributed to the fact that the slow read out of the multiplexed detector necessitates the use of a sophisticated spectrometer technology called step-scan.

Although such large arrays offer the advantage of speed of measurement through the acquisition of many pixels in parallel, currently available devices suffer from a loss of signal/noise ratio when compared with the projected performance based on a single array element. The loss arises from inefficiencies incurred in the multiplexing needed to handle the signals from such a large number of elements. In addition, the photovoltaic technology used in these arrays results in a reduced wavelength range when compared with the photoconductive devices used as single element detectors.

We have proposed in European Patent Application No 00307372.3 to use a relatively small detector array whose outputs are sufficiently small in number so that they can be processed without the need for complex multiplexing of the outputs.

SUMMARY OF THE INVENTION

One aspect of the present invention is concerned with a detector array, which can be used with an infrared imaging microscope and can provide the benefits of reduced measurement times without the significant increase in costs associated with the large detector arrays referred to above.

According to one aspect of the present invention there is provided an IR microscope comprising a sample stage, optical components for guiding analyzing radiation so that it is incident on a sample to be analyzed, which is carried on the stage, and for guiding radiation from the sample to a detector, wherein the detector comprises a small array of individual detector elements, the outputs of the detector elements being fed in parallel to processing means for processing the detector element outputs.

Thus the present invention proposes using in an infrared imaging microscope, a relatively small detector array whose outputs are sufficiently small in number that they can be processed without the need for complex multiplexing or perhaps any multiplexing at all. Thus the microscope does not incur the reduction in signal to noise ratio, which is a feature of large scale multiplexing. Such a detector array can be used in such a way as to provide relatively low measurement times without any substantial increase in cost of either the detector array or the processing circuitry needed to process the outputs of the detector elements. In addition, it becomes more practical to employ photoconductive technology for the detector elements, permitting an increased range to longer wavelength. A small detector array will typically comprise between 3 and 100 detector elements. Typically the upper limit will be 64 and a preferred arrangement will have 16.

Each detector element may have its own associated detector circuitry. The detector elements can be arranged in a linear array. The detecting elements of the linear array may be spaced apart.

The detector elements may be arranged in a plurality of rows. The detector elements in each row may be spaced apart and the rows themselves may be spaced apart. The detector elements in each row may be offset relative to those in other rows. The detector elements may be arranged such that the center of each element is located at a position corresponding to a point on a regular grid. The grid pattern may be square or rectangular. The spacing between the centers of elements in each row may correspond to a multiple of the spacing of the points of the grid. The spacing between centers of adjacent rows may correspond to a multiple of the spacing of the points of the grid. The offset in detector element position in adjacent rows may correspond to the spacing of the grid or a multiple of the spacing of the grid. The dimensions of each detector elements may be substantially equal to that of the spacing of the grid. The detector elements may be rectangular and aligned with the grid pattern.

Another aspect of the present invention provides a detector array for use in an IR microscope, said detector array comprising a plurality of individual detector elements, which are disposed in spaced relationship, the spacing between adjacent elements being substantially equal to a dimension or a multiple of the dimension of a detector element. A detector array of this structure in, which the detector elements are spaced apart facilitates connections to the detector elements and because, at any particular stage position, the areas viewed by the detector elements correspond to the spaces between detector elements at a previous stage position, an effective fill-in factor can be achieved. This avoids the problem of prior art array elements where the entire sample area may not be mapped because of dead areas at the junctions of adjacent detectors.

A further aspect of the present invention provides for a large single element detector to be deployed alongside the array as an alternative detector. This allows the microscope to be used alternatively in the more traditional single pixel mode where a mask in the intermediate image plane of the microscope is adjusted to isolate a specific portion of the sample for measurement. This capability is useful for spot measurements on sizable areas where sensitivity is less of an issue and can be traded for further increased wavelength range in the single detector element, for some oddly shaped or oriented sample areas, and for some line scans to which the array may be ill-suited.

Another aspect of the present invention is concerned with a circuit which can be used to process the outputs of an array of photoconductive detectors with reduced cross-talk.

Accordingly, there is provided a circuit for processing the outputs of an array of photoconductive detectors comprising amplifier means for amplifying the outputs of the detectors, analog-to-digital conversion means for digitizing the amplified outputs and processing means for processing the digitized signals, said processing means being arranged to apply a linearity correction to the digital signals. Each detector may be operated in a constant voltage mode. Each amplifying means may include a preamplifier associated with each detector and the amplifier outputs may be combined to provide a common positive feedback. The analogue-to-digital conversion means may be arranged to operate by over sampling the amplified outputs. The analog-to-digital conversion means may be arranged to sample optical path difference intervals corresponding to half a laser fringe.

The processing means may be arranged to apply a linearity correction according to the following algorithm:

$$y' = y/(1 - \alpha y) \tag{1}$$

where y is the output of the analogue-to-digital converter, y' is the corrected output and $\alpha$ is a parameter. The parameter $\alpha$ may be a constant or it may be a function of energy incident on the detectors. Different elements in the array may require different values of the parameter $\alpha$.

BRIEF DESCRIPTION OF THE DRAWINGS

The invention will be described now by way of example only, with particular reference to the accompanying drawings. In the drawings.

DETAILED DESCRIPTION OF THE DRAWINGS

Figure 1:
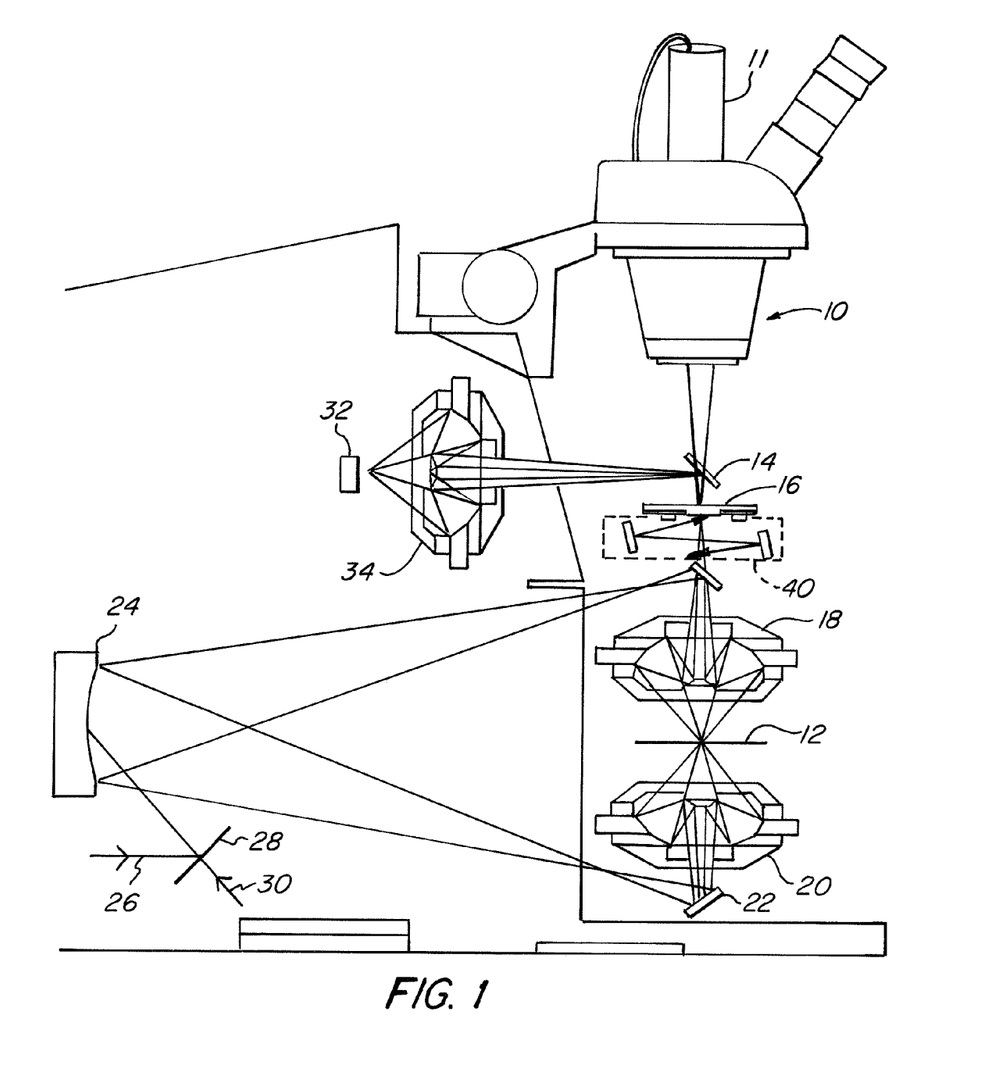
FIG. 1 is a side schematic view of an FT-IR microscope with which the present invention can be used.

Referring to FIG. 1 there are shown the principal elements of an FTIR microscope with which the present invention can be used. This microscope includes an optical microscope (10) which can be used to view a sample on a sample stage (12) through a dichroic mirror (14), a remote aperture (16) and an objective Cassegrain mirror assembly (18). The optical microscope can incorporate a video camera (11), which is coupled to a computer that controls the microscope. The video camera (11) can be used to create on the display device of the computer a video image of a sample under investigation. The microscope also includes a condenser Cassegrain mirror assembly (20), a lower mirror (22) and a toroid reflector (24). The microscope can receive radiation from a source of infrared radiation (not shown), which may be located in an associated spectrophotometer. The incoming infrared beam (26) is directed by way of a flat dichroic mirror (28) towards the toroid reflector (24). The microscope includes a source of visible radiation (not shown), which can produce a beam (30) of visible radiation along a path, which extends through the flat mirror (28). The visible radiation source can be mounted at a suitable location in the microscope.

A detector of infrared radiation such as an MCT detector (32) is disposed laterally from the dichroic mirror (14) and can receive infrared radiation reflected from that mirror by way of a detector Cassegrain mirror assembly (34). The way in which a microscope of this general form operates will be apparent to those skilled in the art and a description can be found for example in an article by D. W. Schiering, E. G. Young and T. P. Byron entitled "An FTIR Microscope" published in American Laboratory, November 1990.

In microscopes of the present type, the stage (12) is usually movable under computer control in at least a horizontal plane so that areas of interest of a sample located on the stage (12) can be identified using a video image generated by the video camera (11) and data relating to those locations is stored in the computer. The computer then subsequently controls movement of the stage automatically to obtain measurements from the identified areas of the sample. A detailed description of a microscope incorporating this facility can be found in EP-A-0731371.

It will be seen that the present embodiment includes an assembly, which is shown at (40) and is disposed in the beam of radiation propagating towards the remote aperture (16). This is an assembly, which can be moved into or out of the beam of radiation in order to change the magnification provided by the microscope. The assembly is shown in more detail in FIG. 2 of the drawings and can be seen to be located between the objective Cassegrain (18) and the position (42) where that Cassegrain normally forms its intermediate image. The assembly includes the first planar mirror (43), a first generally spherical mirror (44), a second generally spherical mirror (45) and a se3cond planar mirror (46). The elements (43 to 46) are formed as a single integral unit, which can be rotated about a horizontal axis extending through the spherical mirrors (44 and 45). Thus the assembly can be rotated from the position shown in FIG. 2 of the drawings in which the mirror (43) deflects the beam of radiation propagating from the Cassegrain objective (18) towards the mirror (44), to a position in which the mirrors (46 to 43) lie in a common horizontal plane and are therefore disposed out of the beam of radiation propagating from the Cassegrain. The assembly also includes a planar reflector (48), which acts as a cold shield as will be described later.

Figure 2:
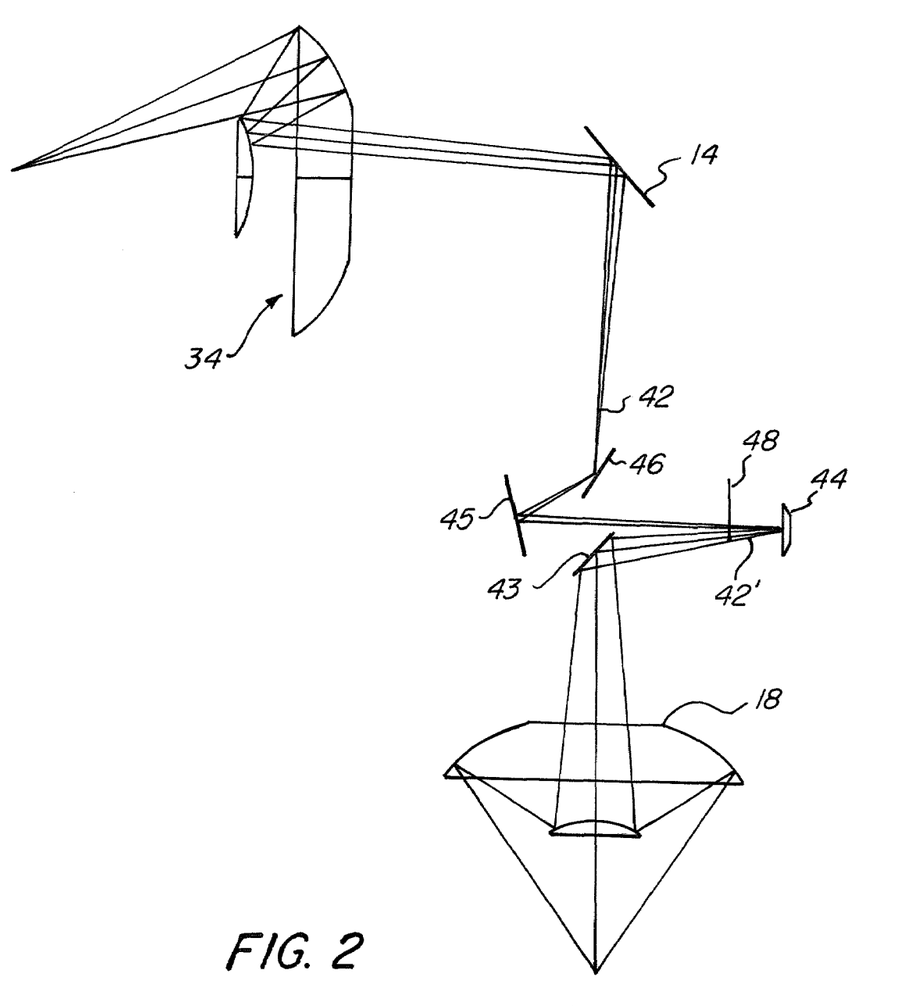
FIG. 2 is a more detailed view of a magnification assembly used in the microscope of FIG. 1.

With the assembly (40) in the position shown in FIG. 2 of the drawings, radiation emanating from the sample on the sample stage (12) is collected by the Cassegrain objective (18) and intercepted by the planar mirror (43) so that it is directed towards the spherical mirror (44) via a new intermediate focus (42'). The radiation is then reflected by the spherical mirror (44) and propagates as a substantially parallel beam towards the second spherical mirror (45) before being reflected back towards the second planar mirror (46) and than focused at the original intermediate focus (42). It should be noted that the cold shield (48) has an aperture formed therein through which the parallel beam can pass. Thus, by inserting the assembly of components (44 to 46) into an operative position, the image is returned to the normal position (42) of the intermediate image, but has been magnified by the magnification factor provided by the two spherical mirrors (44 and 45). Typically this factor will bee in the region of four.

The assembly of magnifying elements of the present embodiment are made up of four elements (44 to 46) and these can be conveniently aligned and held rigidly in an assembly, which is separate from the other elements of the microscope and simply switched into or out of the radiation beam emanating from the objective Cassegrain (18) by a rotation step in order to provide an additional four times magnification whenever that is required. The rotation step through 90° is one example of a way in which the assembly can be switched into or out of the beam and is a particularly simple arrangement. It will be apparent to those skilled in the art that a simple rotation of this form can be automated using a simple motor in conjunction with two end stops. Only one of the end stops needs to be precisely located, namely that which is used to locate the elements in the position shown in FIG. 2. The stop which controls the positioning of the assembly at its non-operative position does not require such accurate location.

Figure 2A:
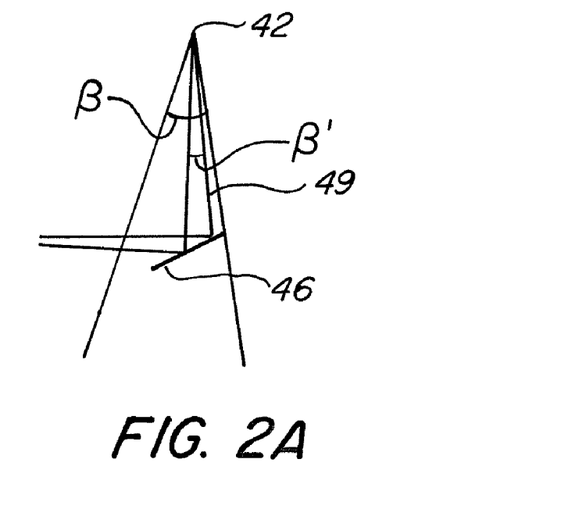
FIG. 2A shows an enlarged scale part of the assembly of FIG. 2.

It will be seen from FIG. 2 and also particularly from FIG. 2a that when the assembly of magnifying elements is in its operative position, the cone of rays (β') arriving at the intermediate focus (42) has a narrower cone angle than that of the cone of rays (β) arriving at the intermediate focus when the magnifying assembly is not in its operative position. It should be noted that FIG. 2a is intended to illustrate the different cone angles and is not necessarily to scale. The difference in cone angles is a natural consequence of providing increased magnification. It should be noted that the beam (49) provided by the components of the magnification assembly (40) is directed at an angle to the image plane flowing only one side of the original cone (β) rather than a scheme of routing rays near normal to the surface. This is because the rays close to the axial direction would be intercepted by the blind spot generated by the secondary of the detector Cassegrain (34) as can be appreciated from the rays emanating from the objective Cassegrain (18). In fact, the proportions of the Cassegrain elements dictate that the extra magnification introduced by the assembly should be at least four times in order to keep the exit beam narrow enough to avoid vignetting by the detector Cassegrain secondary.

It will be appreciated that the arrangement shown in FIG. 2 is one example of a magnification assembly which can be used. Other combination of mirrors are possible such as, for example, a spherical mirror and a flat mirror, or two parabolic mirrors or two ellipsoidal mirrors. However, while such aspheric mirrors may provide minor improvements in image quality, they are substantially more difficult and expensive to manufacture. It is also possible to use mirrors, which are toroidal approximations to the ideal shape, these mirrors being s suitable compromise between cost and quality. It will also be appreciated that it is possible to use ray trace optimization programs in order to generate optimum surface figures that are not true conic sections.

Other geometric arrangements of rays are possible. For example, it is possible to employ a scheme similar to the one illustrated in FIG. 2, but located after the intermediate image (42). In such an arrangement, the image presented as an input to the magnification stage would be real and the output would be virtual as opposed to the alternative arrangement, which is illustrated in FIG. 2. In a further alternative, the beam from the second spherical mirror could be directed below, rather than above its input, to create a C-beam geometry. This scheme is probably most advantageous in an arrangement comprising a combination of two parabolic mirrors chosen to minimize aberration in this configuration.

An important factor in all alternative arrangements is the need to control image aberration, maintaining the smallest practical angle between input and output beams at each of the curved mirrors in the magnification assembly.

As referred to above when the magnification assembly is in its operative position, the beam of radiation propagating towards the intermediate focus (42) has a cone angle which is narrower than that when the magnification assembly is not in its operative position. This bundle of rays propagates to the detector (32) and the result is that the detector field of view is under-filled compared with the situation when the magnifying assembly is not operative. The detector, being an MCT type detector, is typically cooled to liquid nitrogen temperatures and is usually located in a Dewar type vessel. There is the possibility with the present arrangement of enhancing the signal-to-noise ratio in the 4×magnification situation by masking out room temperature photons arriving at the detector in the unused portions of its field of view. While this could be achieved by a switched cold shield inside the detector to match the field of view, which exists when the 4×magnification is used, this can be difficult to implement inside a Dewar container.

Figure 3:
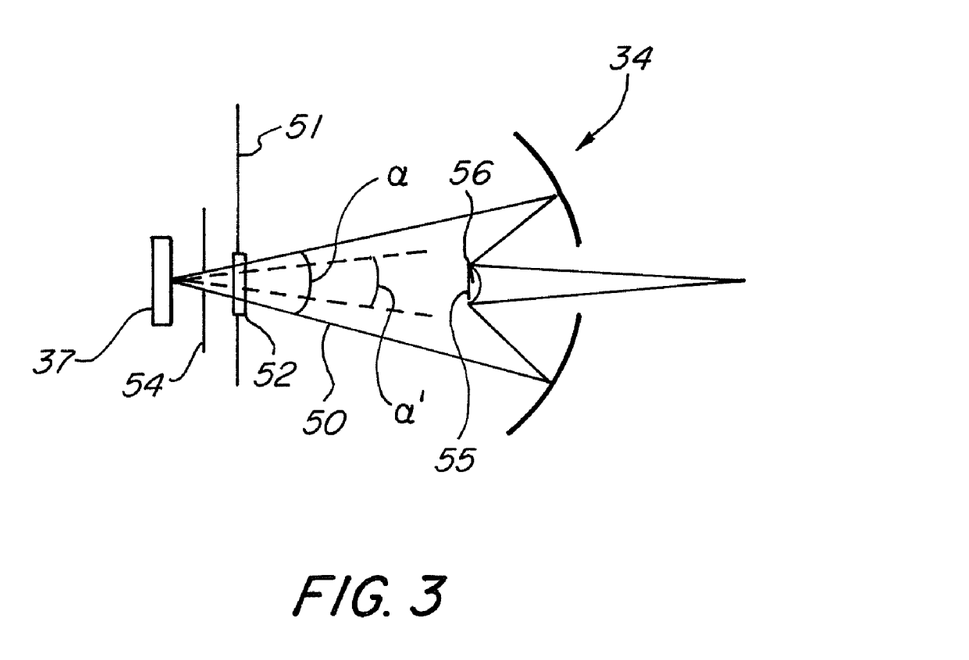
FIG. 3 illustrates the principle of a cold shield.

This will be explained initially by reference to FIG. 3. FIG. 3 shows schematically the MCT detector (32) receiving JR radiation (50) via the detector Cassegrain (34). The detector (32) is located within a Dewar vessel, whose wall is shown at (51), so that its temperature can be maintained at 77° K. Radiation to be detected enters the Dewar vessel through a window (52). A cold shield (54) is disposed between the window (52) and the detector (32) and operates to ensure that only radiation within cone angle α is incident on the detector, where α is the cone angle of rays reflected from the mirror (14) when the magnification assembly (40) is not in its operative position. The cold shield (54) thus restricts the field of view of the detector (32), to that which is necessary to receive the incoming radiation (50) to be detected, thereby substantially preventing infrared radiation from the relatively warm surrounding region from reaching the detector.

A typical detector (32) has a field of view matched to the input beam (50) at a focal ratio of about f/1. When the magnifying assembly is in its operative position, the cone angle of the beam incident on the detector reduces to a! α' shown in FIG. 3. The angular spread of the beam now corresponds to approximately f/4. It can be seen that in this situation the detector can receive warm photons from the region between the cones α and α'. The cold shield used for cone angle α is not appropriate for cone angle α' since it allows in these warm photons.

The cold shield is located within the Dewar vessel and it is not a simple matter to provide, within that vessel, a switched cold shield that could cater for both cone angles.

We have recognized that it is possible to provide a switched cold shield using an appropriate optical component or components, which are disposed externally of the Dewar vessel. Any such switched cold shield should operate to image the detector onto a cold object in that part of the field of view of the detector not used for the input beam and not covered by existing cold shield (54). This could be within the interior of the Dewar detector, such as the detector itself and its immediate surroundings. As an example, a mirror placed outside the Dewar vessel could be located to image the detector back on itself or onto an adjacent non-reflecting cold area. Such a mirror would require in it, an aperture to allow through the beam (50).

FIG. 2 shows one way in which the cold shield can be implemented using the plane minor (48).

With the magnification assembly of FIG. 2, it is possible to provide an effective cold shield externally of the Dewar in the following way. The planar mirror (48), in which is formed a through hole, is placed between the spherical mirror (44) and (45) as shown. The hole is dimensioned so as to allow the parallel beam of rays reflected from the first spherical mirror to pass through, but also to prevent rays outside that beams from propagating. More importantly, rays traveling in reverse through the system, but outside the illustrated beam, are reflected back on themselves by the plane mirror (48). The significance of this is that in unused parts of the detector field of view, the detector sees, in effect, a reflection of itself or radiation emanating from a body at 77° K. rather than room temperature. 77° K. is typically the temperature inside a Dewar containing the MCT detector. Since the detector can have significant reflectivity, it can be desirable to enhance this scheme further by tilting the plane mirror (48) slightly, so that the detector images back to a spot adjacent to itself, which may then be coated with a very low emissivity coating. The result is an externally switched cold shield, which can minimize unwanted room temperature photons at both magnifications contributing to an improved signal-to-noise ratio.

It is also possible to improve cold shielding by minimizing the effect of warm photons from other parts of the field of view of the detector. For example, the rear surface (55) of the secondary mirror (56) of the detector Cassegrain assembly (34), is a source of such photons. This unwanted radiation can be effectively eliminated by placing a suitable concave spherical mirror on the rear surface (55) to augment the already described cold shielding. The input beam propagates from the annulus around the secondary mirror (56), so there is no need for any hole in this additional minor. The effect of this additional cold shield will be most marked at the higher magnification, although it will still have an effect at the lower magnification.

Figure 4:
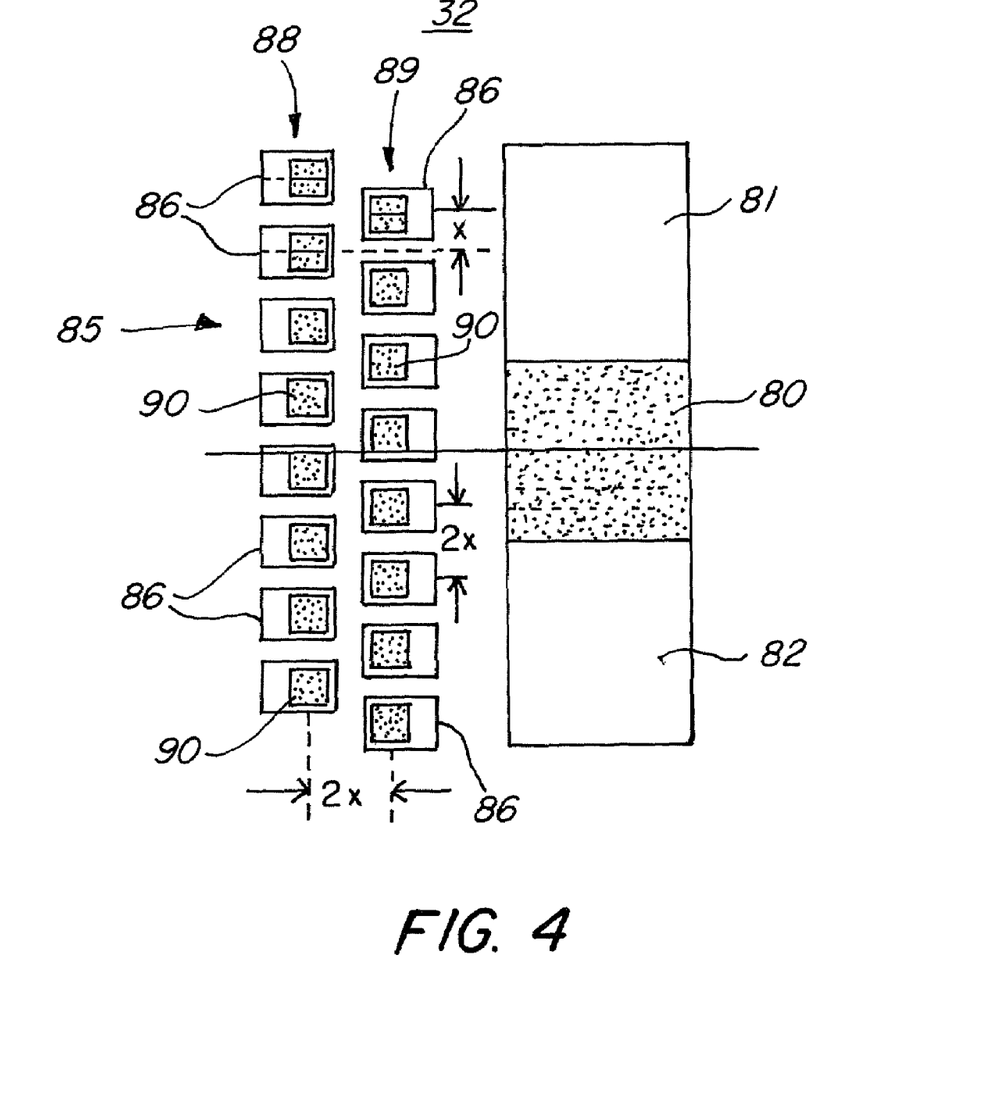
FIG. 4 is a schematic illustration of the structure of the detector used in the microscope of FIG. 1.

Referring now to FIG. 4 of the drawings, there is shown schematically a preferred form of detector assembly for use as the detector (32) in the arrangement of FIG. 1. The detector assembly comprises two parts, a first of which is a single detector element (80) of the type which has been used conventionally and on either side of which are dark areas (81 and 82). The second part comprises a small detector array shown generally at (85). The array comprises sixteen detector elements (86), which are arranged in two rows (88 and 89). Each detector element (86) has a rectangular active area (90), which is responsive to infrared radiation incident on it. The remainder of the rectangular detector element (86) denotes a possible extended electrically active area, which may enhance sensitivity. The active area (90) of each detector element (86) corresponds to a pixel.

The detector elements of the array are arranged in that, the center of each element is located at a point on a square grid in which adjacent points have a spacing x.

The detector elements in each row (88, 89) are spaced apart, the spacing between the centers of adjacent elements being 2x. Similarly, a line joining the centers of the active regions (90) of the row (89) is spaced from a line joining the centers of the active regions (90) of the row (88) by substantially the same distance 2x. In addition, it will be seen that the elements of the row (89) are offset relative to the elements of row (88), the offset being substantially equal to x. The active areas of the elements are generally square the linear dimensions of, which correspond substantially to the distance x.

Each of the optically active regions (90), has an output line (not shown), which extends to processing circuitry for processing electrical signals generated by the detector elements (86) when infrared radiation falls thereon. With the arrangement shown in FIG. 4, the signals transmitted along these lines do not require multiplexing so that each detector elements (86) has its own associated detection circuitry.

Therefore, each detector element (86) has its own associated detection circuitry. The detector elements may share a common electrical connection. Furthermore, because the elements of the array are not closely packed, i.e. they are spaced apart, the design of the elements can be optimized to give the best performance. For example, each element can be photoconductive with improved wavelength range and the design parameters can be adjusted for the highest quantum efficiency rather than detectivity. This would best suit the relatively high signal levels present in IR microscopy. It will be appreciated that, in use, the small array shown in FIG. 4, is used to create an image 16 pixels at a time and the image is built up over a period of time in a manner similar to that carried out in existing microscopes, by stepping the sample stage to map the required area of the sample under investigation. At each step of the sample stage, the detector array (85) receives radiation from an area of the sample not previously covered by the array. For example, looking at FIG. 4, the sample stage could be stepped in increments corresponding to a pixel pitch, so that at each step, areas of the sample corresponding to the spaces between detector elements (86), are covered at a next or subsequent step of the stage. This form of array allows an image of a sample to be built up by effectively tiling the sample.

As has been mentioned, the 16 outputs from the detector elements (86) are fed in parallel to processing circuitry of the microscope and it is envisaged that with 16 parallel measurement channels, a 128×128 pixel image can be obtained in around 3.5 minutes.

The array shown in FIG. 4 of the drawings, has a number of advantages over the large array, which has been used in conjunction with a step-scan system. It has improved wavelength coverage relative to such a large array and also an operator can view the image in real time as it is composed, rather than having to wait until the data collection is complete, which is a requirement of step-scan technology. Another advantage is that of relatively rapid line scans, since the minimum read-out width can be much lower than the 64 pixel width of a large array. The small array also has a greater ability to deal with samples, which are not flat. With any array the entire sample area being mapped onto the array has to be in focus at the same time. Thus, for a relatively large array, not only must a large area of the sample be flat for good results, but it must also be level. This requirement is significantly reduced for a small array and therefore, it is possible to adjust the focus as the sample is moved, in order to cope with the samples that slope or are not flat. Another related advantage of the small array, is that the quality of the image at the array need not be maintained over nearly so wide an area as with a large array. This requirement is difficult to achieve usually in the infrared where there is a limited choice of optical components available.

The arrangement shown in FIG. 4 of the drawings, uses 16 detector elements, i.e. 16 pixels. It will be appreciated that other numbers of detector elements can be employed, but 16 has been selected since it is a number that can be achieved economically without having to provide multiplexing. It is envisaged that a range of from 3 to 100 detector elements (86) could be used in the small array.

It will also be appreciated, that various alternative configurations of detector elements (86) could be used and not only the one shown in FIG. 4. For image generation purposes, some configurations are more efficient than others. Any pattern, which can be repeated so that by stepping the stage it is possible to completely tile the area to be imaged without redundant measurement of any pixel is desirable. Typical images are relatively large compared to the array and edge effects can generally be eliminated in the tiling process. A possible configuration is a 4×4 array in a close packed square, but a practical problem with such a configuration is that finite separations (known as cut lines), exist along juxtaposed portions of detector elements (86) and this can reduce the fill factor substantially below 1, thereby reducing the collection efficiency. Another problem with closely packed detector elements is that of bringing out the electrical connections from each detector element.

At the opposite extreme, it is possible to use a row of 16 elements. This makes it easier to bring out the electrical connections and the cut lines only affect the fill factor in one dimension. The arrangement also has the advantage that the sample step size between successive measurements is only one pixel pitch perpendicular to the line of the detectors, whereas in the 4×4 arrangement, the step size is 4 pixel pitches, assuming that for efficiency, each sample pixel is to be measured only once. The larger step size places a heavier demand on the stepping mechanism when stepping times are a significant factor in the overall measurement time.

The preferred arrangement is that of the type shown in FIG. 4, which 10 comprises displacing alternate elements and staggering them in a double row. This array is particularly advantageous, since it provides ample space to bring out connections and does not suffer from the disadvantage of cut lines between closely adjacent detector elements. It is possible with this arrangement to effectively fill in areas not covered at a previous part of the image acquisition process, and by appropriately locating the detector elements of the array, a fill-in factor of 100% can be achieved. In fact, the effective fill factor can be increased above unity by arranging that the linear dimension of the region (90) of each detector element (86) to be slightly larger than x. This freedom permits flexibility in a trade off between signal to noise ratio and the modulation transfer function (spatial resolution).

The staggered double row arrangement also has the advantage that the step size between measurements is one pixel pitch.

There is the slight disadvantage of edge effects at the boundaries of the area to be mapped, but this can be accommodated by extending the boundary by a small amount.

It will be noted that, the arrangement shown in FIG. 4 also incorporates a single large detector (80), as is present in conventional microscopes. This allows the microscope to be used in a conventional single detector manner using pixel-by-pixel mapping. Thus, the microscope can provide two modes, that is, rapid mapping of large areas using the small array (85), and integration of the signal from defined areas such as fibers or laminas using the single large detector (80). It should be noted that, the detectivity of the single large detector need not be as high as the detectivity of the elements in the array (85), since in such single pixel measurements, it is practical to allow greater time for accumulating a signal.

The areas (81 and 82) on either side of the single detector are dark areas, which act as a sink for unwanted thermal background radiation, i.e. they act as a cold shield in a manner similar to that which has been described above. The single detector itself forms part of this dark area when the small array (85) is in use.

It will be appreciated that, the detector shown in FIG. 4 can easily be fitted with a suitable window and cold shield in a liquid nitrogen cooled Dewar vessel. It will further be appreciated that, as an alternative to a movable stage, a movable mirror can be provided.

Figure 5:
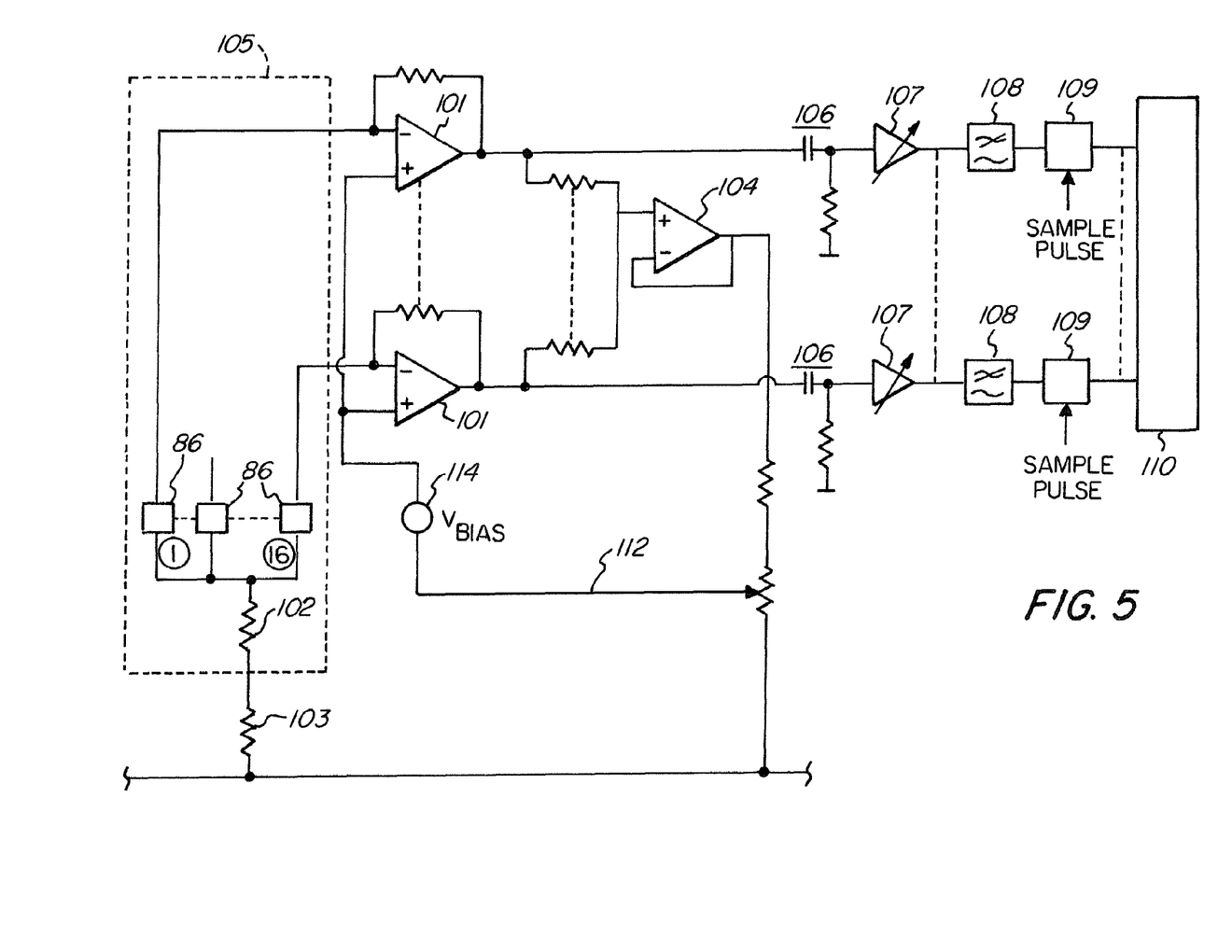
FIG. 5 is a schematic diagram of a circuit which can be used to process the outputs of the detector array shown in FIG. 4.

Circuitry, in accordance with an embodiment of the present invention, which can be used to process the output signals of the detector elements (86) is shown in FIG. 5 of the drawings. As can be seen from FIG. 5, each detector element is connected to one input of a preamplifier (101). The detectors have a common lead resistance, part of which (102) is internal to the Dewar vessel (105), which contains the detectors and part of which (103) is external. The outputs of the preamplifiers are summed at a summation stage (104) and provide a positive feedback loop to the other input terminal of each preamplifier.

The outputs from the preamplifiers (101) are also fed by way of a DC blocking stage (106) to a variable gain amplifying stage (107). The outputs of the variable gain amplifiers are fed via a low pass filter (108) to analog-to-digital converters (ADCs) (109) and the outputs of the analog-to-digital converters (109) are processed by a digital signal processor (110). The circuit can be operated without the DC blocking stages (106), but the dynamic range of the signal at the ADCs (109) may be increased significantly.

In the arrangements shown in FIG. 5, each detector (86) operates in a constant voltage mode in conjunction with its linear preamplifier (101). This method is generally used because it is more linear than operating the detector in a constant current mode. However, one consequence of operating in the constant voltage mode is that crosstalk can occur between the detector elements, due to the effects of common lead resistance. In the circuit shown in FIG. 5 crosstalk is reduced by summing the signal from the sixteen preamplifiers at the summation stage (104) and feeding back a fraction of this signal to the bias voltage as positive feedback (112). This compensates for the signal dependent voltage drop across the common lead resistance (102, 103). It will be noted that in the circuit of FIG. 5 there is a common bias voltage (114) and a single positive feedback term for all sixteen detector elements and therefore, this arrangement can provide compensation only for the effects of the common lead resistance and cannot correct for other sources of non-linearity in the individual detector elements. The purpose of the positive feedback is therefore, principally to provide cancellation of crosstalk. However, in doing so, it does reduce to a certain extent overall detector non-linearity by eliminating that which would otherwise arise from the common lead resistance.

The outputs from the preamplifiers are fed to the DC blocking filters (106). Ideally, the time constant of the DC blocking filter should be long in order to avoid distorting the interferogram. However, mechanical movement of the sample in the microscope can result in large changes in DC level from the detector and this necessitates the use of a short time constant for the DC blocking filter (106) in order for the DC level to settle quickly. Thus, the circuit shown in FIG. 5 uses a short time constant DC blocking filter and the effects of this are compensated by a digital infinite impulse response filter in the digital signal processor (110).

The amplified signals from the variable amplifying stages (107) are digitized by ADCs (109). Each ADC (109) digitizes at a rate which involves oversampling of the data. Linearization is provided in the digital signal processor (110) and the data rate can be subsequently reduced by a technique such as that described in U.S. Pat. No. 5,914,780, or by simple digital filtering depending upon the sampling method used.

Figure 6:
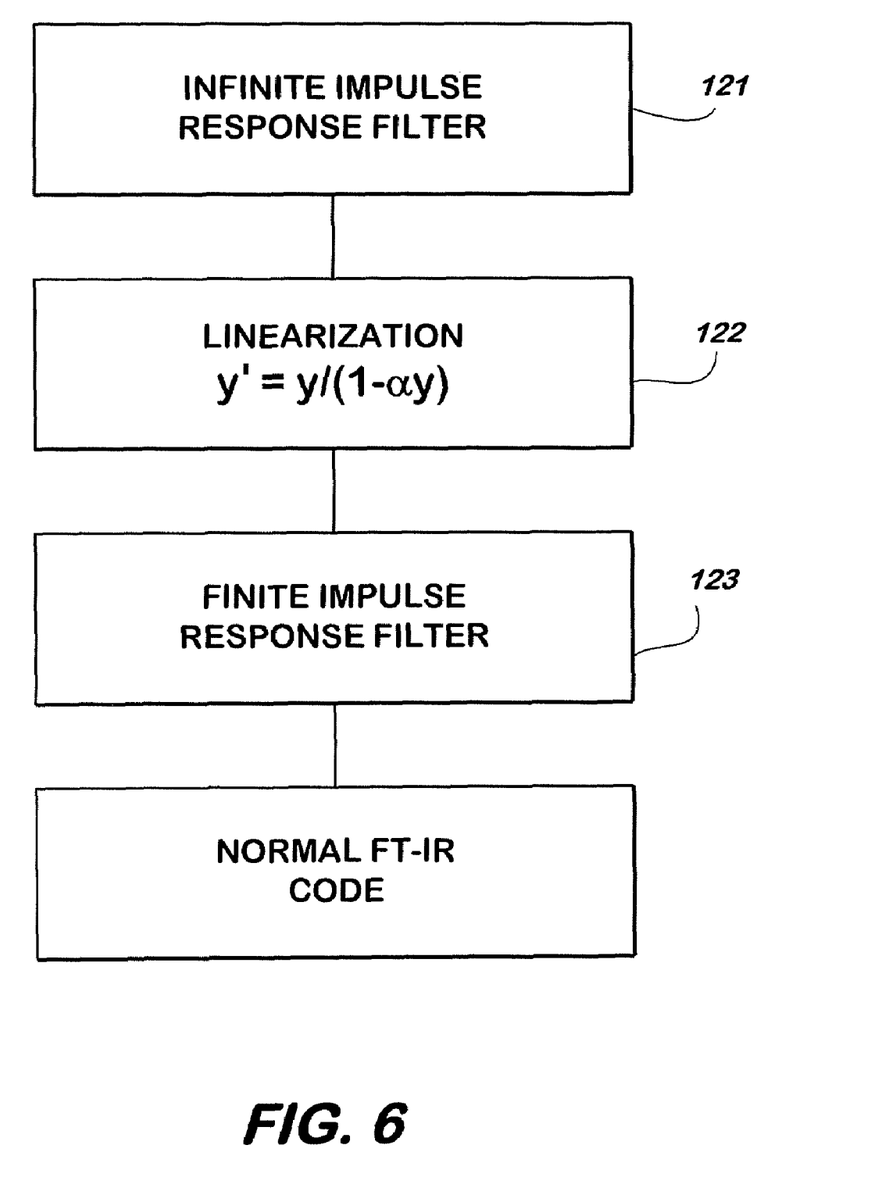
FIG. 6 is a flowchart illustrating the software functions implemented in the digital signal processor of FIG. 5.

The digital signal processor (110) is arranged to perform under software control the functions shown in the flowchart of FIG. 6. The received signals are first applied to an infinite impulse response filter (121), the function of which is described above.

The filtered signals are then subjected to linearization (122). The algorithm used for linearization is $y'=y/(1-\alpha y)$ where y is the data from the ADC, y' is the value after correction, $\alpha$ is a parameter that may be a constant or may be a function of the time averaged incident energy. This algorithm is one, which will cancel out the effects of non-linearity equivalent to that arising from the fixed series resistance of each detector.

Problems can occur if the bandwidth is limited prior to the linearity stage. This is because the distortion introduced by the detector non-linearity results in harmonics, which are required in order to recreate the original illumination signal. Oversampling at the ADC (109) allows the signal bandwidth to be increased, thereby ensuring that these harmonics are not lost while not degrading the system signal-to-noise performance.

One form of oversampling at a fixed rate is described in U.S. Pat. No. 5,914,780. Another more conventional way to accomplish this, is to trigger each ADC (109) at optical path difference intervals corresponding to half a laser fringe. This is equivalent to oversampling by a factor of about 3. In this case, a low pass analog filter is required to limit noise, but the bandwidth can be set to match the oversampling rate and the signal-to noise performance is not significantly degraded.

The linearity correction algorithm can be implemented in software as a polynomial expansion of the above equation expressed as follows:

$$y'=y+\alpha y^2+\alpha^2 y^3+\alpha^3 y^4+\alpha^4 y^5+\ldots \quad (2)$$

This is suitable for situations where the processor (110) does not have a fast divide. A five term expansion is generally sufficient for applications involving FT-IR. After linearity correction, a low-pass finite impulse response digital filter (123) reduces the data rate, typically, by a factor of 2.

The level of positive feedback (112), can be set as a single operation when the system is installed or recalibrated, in order to minimize observed electrical crosstalk between elements. The gain setting for the variable amplifier stages (107), can also be set as a single operation when the system is installed or recalibrated, in order to match the maximum signal levels to the ADCs (109).

The parameter $\alpha$ can be determined by adjusting it to minimize the apparent signal in a single beam spectra below the detector cutoff wavelength. This can be a single operation carried out when a system is installed, although it can also be repeated as part of an ongoing system calibration.

What is claimed is:

1. An IR microscope for directing radiation on a sample to be analyzed, the IR microscope comprising:
    a detector having an array of individual detector elements, said array comprising from 3 to 100 individual elements, each detector element having a detector element output;
    a detection circuit coupled to each detector element output, such that each detector element has its own associated detection circuit, each of said detection circuits including an amplifier for receiving the detector element output and generating an amplified output signal;
    a summation device coupled to each of said amplifier outputs and receiving each of the amplified output signals; and
    a feedback loop directing an output signal of the summation device to each of said amplifiers.

2. The IR microscope according to claim 1, wherein each detector element is operated in a constant voltage mode or constant current mode.

3. The IR microscope according to claim 2, wherein each detector element has a common lead in combination with an amplifying stage which has feedback which acts to minimize crosstalk between the signals of the detector elements.

4. The IR microscope according to claim 1, further comprising processing circuitry including:
    an analog-to-digital converter for digitizing the amplified outputs of the array of radiation detectors.

5. The IR microscope according to claim 4, further comprising a processor for processing the digitized signals.

6. The IR microscope according to claim 5, wherein the processor is arranged to apply a linearity correction to the digital signals according to the following algorithm:

$$y'=y/(1-\alpha y)$$

where y is the output of the analogue-to-digital converter, y' is the corrected output, and $\alpha$ is a parameter.

7. The IR microscope according to claim 6, wherein the parameter $\alpha$ is a constant.

8. The IR microscope according to claim 6, wherein the parameter $\alpha$ is a function of energy incident on the detectors.

9. The IR microscope according to claim 4, wherein the analog-to-digital converter is arranged to operate by oversampling the amplified outputs.

10. The IR microscope according to claim 1, further comprising a single detector element and a processor arranged to process output signals received from either the array or the single detector element.

11. An IR microscope for directing radiation on a sample to be analyzed, the IR microscope comprising:
- a detector having an array of individual detector elements, each detector element having a detector element output;
- said array comprising from 3 to 100 individual elements;
- a detection circuit coupled to each detector element output, such that each detector element has its own associated detection circuit, each of said detection circuits including, a summation device receiving the outputs from the detector elements and a feedback loop directing at least a portion of an output signal of the summation device to each of said detector element outputs.

12. The IR microscope according to claim 11, further comprising an amplifier coupled to the detector element output and generating an amplified output signal to be fed to the summation device.

13. The IR microscope according to claim 11, further comprising processing circuitry including:
- an amplifier for amplifying the outputs of the array of detector elements; and
- an analog-to-digital converter for digitizing the amplified outputs of the array of radiation detectors.

14. The IR microscope according to claim 13, further comprising a processor for processing the digitized signals.

15. The IR microscope according to claim 14, wherein the processor is arranged to apply a linearity correction to the digital signals.

16. The IR microscope according to claim 15, wherein the linearity correction is calculated according to the following algorithm:

$$y'=y/(1-\alpha y)$$

where y is the output of the analogue-to-digital converter, y' is the corrected output, and $\alpha$ is a parameter.

17. The IR microscope according to claim 16, wherein the parameter $\alpha$ is a constant.

18. The IR microscope according to claim 16, wherein the parameter $\alpha$ is a function of energy incident on the detectors.

19. The IR microscope according to claim 11, wherein each detector element is operated in a constant voltage mode or constant current mode.

* * * * *